(12) United States Patent
Granruth et al.

(10) Patent No.: US 8,292,171 B2
(45) Date of Patent: Oct. 23, 2012

(54) FRAUDULENT FUEL PURCHASE DETECTION SYSTEM AND METHOD

(75) Inventors: Michael D. Granruth, Centreville, VA (US); Eric S. White, San Mateo, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 917 days.

(21) Appl. No.: 12/001,843

(22) Filed: Dec. 13, 2007

(65) Prior Publication Data
US 2009/0152346 A1 Jun. 18, 2009

(51) Int. Cl.
*G07B 15/02* (2011.01)
(52) U.S. Cl. ........ 235/384; 235/375; 235/379; 235/381; 235/451; 235/492
(58) Field of Classification Search .................. 235/375, 235/384, 385; 701/1, 29, 35
See application file for complete search history.

(56) References Cited

U.S. PATENT DOCUMENTS

| | | | | | |
|---|---|---|---|---|---|
| 5,204,819 | A | * | 4/1993 | Ryan | 705/413 |
| 6,070,156 | A | * | 5/2000 | Hartsell, Jr. | 705/413 |
| 2003/0195676 | A1 | * | 10/2003 | Kelly et al. | 701/29 |
| 2004/0110044 | A1 | * | 6/2004 | McArthur et al. | 429/13 |
| 2004/0243285 | A1 | * | 12/2004 | Gounder | 701/1 |
| 2006/0292984 | A1 | * | 12/2006 | Teate et al. | 455/41.2 |

* cited by examiner

*Primary Examiner* — Tuyen K Vo

(57) ABSTRACT

In a fuel card monitoring system the vehicle associate with the fuel card is provided with a transmitter and possibly a memory for relaying information associated with a credit transaction, relating to one or more of the vehicle position, the number of miles driven, the amount of fuel taken in, and the turning off and on of the vehicle engine. Information gathering devices may be provided on the vehicle for monitoring the fuel amount, the timing information and the location of the vehicle.

16 Claims, 1 Drawing Sheet

FRAUDULENT FUEL PURCHASE DETECTION SYSTEM AND METHOD

FIELD OF THE INVENTION

The invention relates to fuel purchase cards and the monitoring of transactions using such cards.

BACKGROUND OF THE INVENTION

Companies such as Fleetcor provide a credit card that is linked to a particular vehicle or driver and allows the holder to make fuel and in some cases merchandise purchases. The service provided by Fleetcor allows purchases to be monitored as they are made by drivers of a company owning multiple vehicles such as a trucking company. Since each credit card is linked to or associated with a particular vehicle or driver, any transaction made using the credit card, hereafter referred to for convenience as a fuel card, can be related to a particular vehicle. This allows reports to be created for each vehicle showing the amount of fuel purchased, and when and where it was purchased. It allows the information to be viewed on-line and allows the cards to be centrally monitored and controlled. Thus, each card can be customized to provide different limits on when it can be used, the dollar limit, and whether anything other than fuel can be purchased with the card.

Nevertheless fraudulent practices take place. The cards are for instance used to fill up private vehicles or the company vehicle is used for private purposes. In the past the numbers received from the credit card company have been analyzed by various techniques to detect aberrations and possible fraud. Typically the information received from the credit card company will include the fuel amount involved in a particular transaction, the date and time of the transaction and address of the gas station.

However the addresses received from the credit card company for the various gas stations don't always geocode thus leaving the location of the fuelling stop unknown and opening the door to fraud. Even if the location is correctly identified it is not always clear what is happening to the fuel being dispensed, e.g. whether a private vehicle is being filled up during the same transaction. In fact, it is possible that the company vehicle associated with the credit card is not even at the gas station, and that the card is being used by a family member of the driver.

The present invention seeks to address some of these shortcomings in the prior art credit card monitoring system.

SUMMARY OF THE INVENTION

According to the invention there is provided a method of monitoring fuel purchase transactions that use a vehicle-linked credit card that is linked to a specific vehicle or person, comprising providing the vehicle with a mobile data unit that includes at least one information gathering device and at least one of a transmitter and a memory, monitoring vehicle activity by means of the information gathering device, and comparing the vehicle activity to information obtained through the vehicle or driver linked credit card.

This allows fraudulent fuel purchases associated with a vehicle or driver linked credit card, to be detected. Typically the memory (and any transmitter) is included in a mobile data unit. The mobile data unit is used to monitor vehicle activity at the time of the fuel purchase.

The information relating to the vehicle may include mileage as determined by a vehicle's distance measuring device. The mileage may comprise the mileage since the last fuel purchase or since leaving a home base. The information relating to the vehicle may instead include engine stop and start times, which may be provided by an on-board clock provided on the vehicle. The information relating to the vehicle may instead comprise a position locator on the vehicle, which may be a GPS receiver, RFID reader, or other location determining device. The information relating to the fuel purchase may include fuel quantity information, and the method may include providing an on-board fuel meter mounted on the vehicle.

The transmitter may be a radio or cell phone transmitter, and may be linked to the memory to transmit information from memory when an open transmission channel is available.

The method typically includes capturing the information relating to the vehicle or the fuel purchase at a central location and may include comparing the information to transaction information obtained from the credit card. The transaction information may include one or more of start and stop times of the fuelling process, the location of the gas station where the credit card was processed, the monetary amount of the transaction and the amount of fuel dispensed.

Further, according to the invention there is a provided a fuel card monitoring system for monitoring usage of a fuel card that is associated with a specific vehicle comprising one or more information gathering devices mounted on a vehicle for monitoring aspects about the vehicle or the fuel being purchased, and a memory or transmitter for storing or transmitting the information gathered by the one or more information gathering devices. The information gathering devices may include at least one of a fuel meter, a distance measuring device for measuring the distance traveled by the vehicle since having been last refueled or since leaving home base, an ignition sensor for determining when the vehicle's engine is turned off and on again, and a location determining device such as a GNSS receiver (which may include at least one of a GPS, Galileo, GLONASS, Beidou, or other Satellite Based Augmentation System (SBAS) receiver) or an RFID reader. The system may include a database for centrally capturing the information sent by the transmitter or downloaded from the memory. The database may also capture information from the credit card reader to supplement the information from the vehicle mounted information gathering devices.

DETAILED DESCRIPTION

Figure 1:
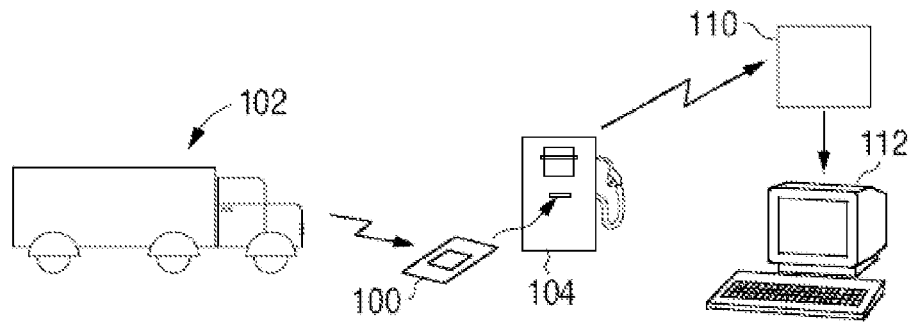
FIG. 1 is a representation of a fuel card monitoring system as known in the art.

The present invention proposes a new system and method for monitoring the use of fuel cards to reduce fraud. These are credit cards that a typically linked to a particular vehicle or driver and will be referred to herein as vehicle or driver linked credit cards or simply as credit cards. These cards are typically used by local service and transportation companies that own multiple vehicles and need to monitor and track the expenses incurred by the various drivers. As shown in FIG. 1, a typical credit card monitoring system as know in the art and as provided, for example, by Fleetcor, collects information from the credit card whenever the card 100 is used to make a purchase of fuel or merchandise. The card 100 is provided with an identification number that is linked to a particular vehicle 102 and the time and nature of use permitted by the card is pre-programmed into a central storage system, e.g. a central database of the credit card company. The parameters of the card are typically defined by an administrator of the transportation company and can be updated as required. In the case of Fleetcor's system programming of the card and access to the card usage information is via the Internet, which allows the transportation company to view different types of information about the various credit cards held by its drivers. Thus, for instance, each credit card can have its information separately displayed showing when, where and how much fuel was purchased on the particular card. Thus when the card 100 is read by the card reader 104, the information is relayed to the central database 110 managed by the credit card company for authorization of the transaction and for capturing the details of the transaction as evident from the card and card reader, e.g. card identification number, card reader location, time of transaction and location. The captured information is then viewable on-line by the transportation company, as indicated by the user's personal computer 112 that accesses the credit card database using a browser as known in the art.

As mentioned above, the information gathered from the credit card and card reader is not always complete and accurate. Also it leaves the door open to filling up other vehicles or multiple vehicles that are not associated with the card in the database 110.

Figure 2:
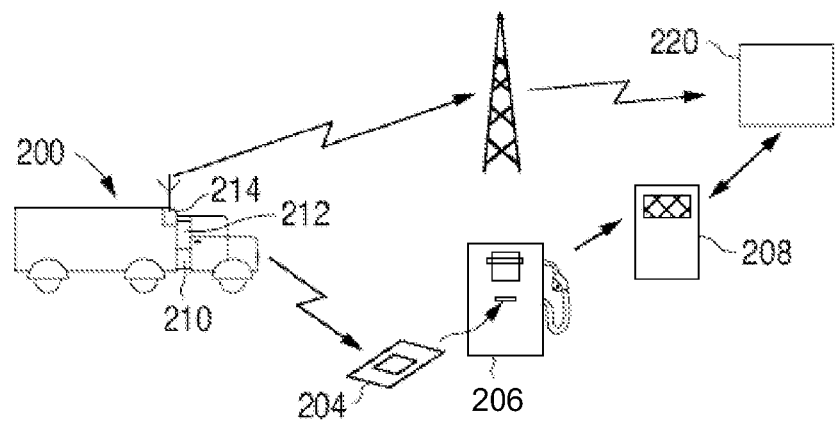
FIG. 2 is a representation of one embodiment of a fuel card monitoring system of the invention.

The present invention therefore proposes supplementing the information by making use of an on-board mobile data unit mounted in or on a vehicle. The data unit includes a memory for capturing information that is transmitted to it from one or more information gathering devices (as is discussed in greater detail below) and optionally also includes a transmitter for transmitting the information to a central location. As is discussed below, the transmitter may be implemented to transmit information directly from the information gathering devices or from the memory. The mobile data unit is associated with the vehicle it is mounted to, e.g., by providing each mobile data unit with a unique identifier code. In this way, the data unit can gather further information that is not evident from the credit card or the card reader. One such embodiment is shown in FIG. 2, which shows a vehicle 200 associated with a credit card 204. During a fuel purchase the card 204 is used in a card reader 206 and information is gathered from the card and, in one embodiment, is sent together with the card reader 206 information to a central database 208 that is typically maintained by the credit card issuing company. In addition the vehicle 200 is provided with several information gathering devices 210, a memory 212, and in this embodiment also a transmitter 214. This is shown more clearly in FIG. 3, which shows information gathering devices 210 comprising a fuel meter 300 that measures the fuel as it is dispensed into the vehicle. Since the fuel meter is mounted in the vehicle 200, any fueling of other vehicles will not be picked up by the fuel meter 300, thereby avoiding fraudulent filling of other vehicles. The information gathering devices 210 also include a distance measuring device 302 for measuring the number of miles or kilometers driven by the vehicle 200. In this embodiment the device 302 is separate from the odometer mounted on the dashboard of the vehicle, but in another embodiment the existing odometer on the vehicle can be coupled to the system to allow the information from the odometer to be captured in memory 212 and transmitted via transmitter 214.

Thus for example, every time the vehicle 200 is fueled (either full-up or only partially fueled) the mileage from the previous fuel stop or since the vehicle left the home base with a full tank, can be captured. By comparing the amount of fuel filled up at each of these fuel stops (or if the tank is only partially filled, by comparing the total fuel used over the course of a trip) against the corresponding mileage, any discrepancies in the consumption can be picked up.

The information gathering devices 210 further include a position determining device, which in this embodiment takes the form of a GPS receiver 304. Although this embodiment specifically makes use of a GPS receiver other embodiments make use of other satellite or GNSS receivers which may include at least one of a GPS, Galileo, GLONASS, Beidou, or other Satellite Based Augmentation System (SBAS) receivers.

However, yet other embodiments of the invention are not limited to satellite based location determining devices, but make use of different position determining devices such as a radio frequency identification (RFID) reader mounted on the vehicle which scans and reads RFID tags mounted at the gas stations. It will be appreciated that the vehicle may simply be provided with an RFID tag, while the gas station is provided with RFID readers. However, in this latter embodiment, the RFID reader at the gas station would have to transmit the RFID reader information to the central station since the RFID tag on the vehicle would simply be a passive device. The position determining device 304 ensures that the vehicle 200 is in fact present at the gas station at the time of the fueling.

The information gathering devices 210 also include an ignition sensor 306 providing information about the engine of the vehicle 200 being turned off and on. The information is linked to a clock 308 to allow the time that the vehicle engine is switched off and when it is switched on again, to be monitored to ensure that it coincides substantially with the fuelling process. The timing information associated with credit cards is fairly accurate and can be used to verify that the transaction corresponds within a certain time frame to the turning off and on of the vehicle engine. For instance, the start and stop of the credit card transaction should be approximately within 1 minute of the engine being switched off and on again. Instead of associating the engine stop and start with the credit card timing information as defined by the credit card reader 206, the timing of any other aspect of the fuelling could be used as a reference, e.g., the duration that the fuel meter 300 detects fuel being filled into the vehicle. In such an embodiment the fuel meter includes a clock or is linked to a clock for capturing timing information relating to the fueling process. In one embodiment the clock also tracks the date so that the date of the transaction can be captured.

It will be appreciated that although the present embodiment shows multiple information gathering devices, other embodiments may include only one or some of the information gathering devices. For instance the ignition sensor 306 could provide some level of verification even if a location determining device 304 is not provided. Similarly, the vehicle may be provided only with a location determining device 304 and a fuel meter 300.

Figure 3:
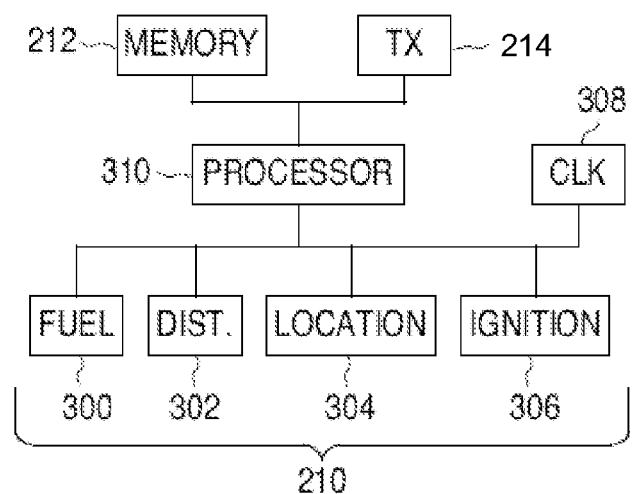
FIG. 3 is a block diagram of one embodiment of the vehicle portion of a fuel card monitoring system of the invention.

Furthermore, in the FIGS. 2 and 3 embodiment, the information gathering devices 210 and clock 308 are connected to a processor 310, which in turn is connected to a memory 212 where information gathered by the information gathering devices is stored. The processor 310 is also connected to a transmitter 214, which in this case is a cell phone transmitter but could be any other transmitter such as a radio transmitter, for transmitting information either directly from the information gathering devices to a central location such as a database 220 at the transportation company, or from the memory 212 to the central location 220. Insofar as the transmitter 214 is in a location where there is no available communication channel, e.g. because of lack of cell phone coverage, the information gathering device information can be retained in the memory 212 for subsequent transmission when a channel becomes available or for downloading to the database 220 once the vehicle 200 is back at the transportation company facilities. The transmitter, in one embodiment is provided with a channel monitor to determine when a channel is available for transmitting information.

It will be appreciated that in another embodiment, the transmitter 214 may be eliminated altogether, relying instead on centrally downloading the information from the memory 212 once the vehicle 200 is back at the home base. In yet another embodiment, only a transmitter 214 is provided, while the memory 212 is eliminated altogether. This requires direct transmission of any information gathered by the information gathering devices. Thus, while the present invention has been described with respect to a few particular embodiments, it is not so limited and includes different implementations as defined by the claims.

What is claimed is:

1. A method of detecting fraudulent fuel purchases with a vehicle or driver linked credit card, comprising
    providing the vehicle with a mobile data unit that includes a plurality of information gathering devices and at least one of a transmitter and a memory,
    monitoring vehicle activity via one or more of the plurality of information gathering devices, said information gathering devices comprising:
        a radio frequency identification (RFID) component disposed upon said vehicle, wherein said RFID component is configured to monitor vehicle location activity by interacting with a complimentary RFID component at a gas station to determine that the vehicle is present at the gas station, and
        an on-board fuel meter mounted on the vehicle and configured to monitor fuel filling activity by measuring fuel as it is dispensed into said vehicle,
    comparing the vehicle activity to information obtained through the driver or vehicle linked credit card, and
    detecting a fraudulent fuel purchased based on a discrepancy between the vehicle activity and quantity of fuel purchased by the driver or vehicle linked credit card.

2. A method of claim 1, wherein the vehicle activity comprises the distance covered by the vehicle as determined by the vehicle's odometer or a separate distance measuring meter.

3. A method of claim 2, wherein the distance covered by the vehicle comprises the distance since the last fuel purchase or since leaving a home base.

4. A method of claim 1, wherein the vehicle activity comprises engine stop and start times, which are provided by an on-board clock provided on the vehicle.

5. A method of claim 1, wherein the vehicle activity comprises a position locator mounted on the vehicle.

6. A method of claim 5, wherein the position locator comprises a GPS receiver, or other location determining device.

7. A method of claim 1, wherein the vehicle activity further comprises the time, and the date of the fuel purchase.

8. A method of claim 1, wherein the transmitter comprises at least one of a radio, satellite, or cell phone transmitter.

9. A method of claim 8, wherein the transmitter is linked to the memory, said method further comprising:
    transmitting information from the memory when an open transmission channel is available.

10. A method of claim 1, further comprising capturing the information relating to the vehicle activity at a central location.

11. A method of claim 1, wherein the information obtained through the vehicle or driver linked credit card comprises one or more of the date of a fuel purchase transaction, start and stop times of the fuelling process, the location of the gas station where the credit card was processed, the monetary amount of the transaction and the amount of fuel dispensed.

12. A fuel card monitoring system for monitoring usage of a fuel card that is associated with a specific vehicle or driver, comprising
    a plurality of information gathering devices comprising at least:
        a radio frequency identification (RFID) component mounted on a vehicle for monitoring aspects about the vehicle or the fuel being purchased wherein said RFID component is configured to monitor vehicle location activity by interacting with a complimentary RFID component at a gas station to determine that the vehicle is present at the gas station,
        an on-board fuel meter mounted on the vehicle and configured to monitor fuel filling activity by measuring fuel as it is dispensed into said vehicle, and
        an ignition sensor for determining when the vehicle's engine is turned off and on again, and
    a transmitter for transmitting the information gathered by the one or more information gathering devices.

13. A system of claim 12, wherein the information gathering devices further comprise at least one of a distance measuring device for measuring the distance traveled by the vehicle since having been last refueled or since leaving home base, and a location determining device in the form of a GNSS receiver.

14. A system of claim 13, wherein said GNSS receiver comprises at least one of a GPS, Galileo, GLONASS, Beidou, and any other Satellite Based Augmentation System (SBAS) receiver.

15. A system of claim 12, further comprising a database for centrally capturing the information sent by the transmitter or downloaded from the memory.

16. A system of claim 15, wherein the database is configured to capture information from a credit card reader to supplement the information from the vehicle mounted information gathering devices.

* * * * *